US012729008B2

(12) United States Patent
Jeon et al.

(10) Patent No.: US 12,729,008 B2
(45) Date of Patent: Sep. 8, 2026

(54) APPARATUS FOR CONTROLLING POWER AND METHOD THEREOF

(71) Applicants: Hyundai Motor Company, Seoul (KR); Kia Corporation, Seoul (KR)

(72) Inventors: Yoon Cheol Jeon, Suwon-Si (KR); Jin Soo Jang, Yongin-Si (KR); Jong Pil Kim, Suwon-Si (KR); Hyun Ki Cho, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 174 days.

(21) Appl. No.: 18/380,850

(22) Filed: Oct. 17, 2023

(65) Prior Publication Data

US 2024/0359805 A1 Oct. 31, 2024

(30) Foreign Application Priority Data

Apr. 27, 2023 (KR) ........................ 10-2023-0055556

(51) Int. Cl.

*B64D 31/00* (2024.01)
*B60C 29/00* (2006.01)
*B60L 50/60* (2019.01)
*B60L 53/00* (2019.01)
*B60L 58/10* (2019.01)
*B64D 27/34* (2024.01)
*H01M 10/42* (2006.01)
*H01M 10/44* (2006.01)

(52) U.S. Cl.

CPC .............. *B64D 31/00* (2013.01); *B60L 50/60* (2019.02); *B60L 53/00* (2019.02); *B60L 58/10* (2019.02); *H01M 10/4264* (2013.01); *H01M 10/441* (2013.01); *B60L 2200/10* (2013.01); *B60L 2210/10* (2013.01); *B64D 2221/00* (2013.01); *H01M 2220/20* (2013.01)

(58) Field of Classification Search

CPC ..... B64D 31/00; B64D 2221/00; B60L 53/00; B60L 50/60; B60L 2200/10; H01M 10/4264; H01M 10/441; H01M 2220/20

USPC ........................................................... 307/9.1

See application file for complete search history.

(56) References Cited

U.S. PATENT DOCUMENTS 9,789,782 B2 10/2017 Holgers et al.
11,444,301 B2 9/2022 Chou et al.
(Continued)

FOREIGN PATENT DOCUMENTS

JP 2022-125890 A 8/2022
KR 101302078 B1 9/2013
KR 101667330 B1 10/2016

OTHER PUBLICATIONS

Apr. 8, 2024—(EP) European Search Report—App 23208519.1.

*Primary Examiner* — Rexford N Barnie
*Assistant Examiner* — Swarna N Chowdhuri
(74) *Attorney, Agent, or Firm* — Banner & Witcoff, Ltd.

(57) ABSTRACT

A power control device is provided for an aircraft. The power control device may include at least one first battery, a second battery having a lower power density and higher energy density than the at least one first battery, at least one lift motor connected, via a first electrical path, to the at least one first battery, a cruise motor connected, via a second electrical path, to the second battery, and a power control circuit configured to control the at least one first battery, the second battery, the at least one lift motor, and the cruise motor.

16 Claims, 12 Drawing Sheets

(56) References Cited

U.S. PATENT DOCUMENTS

| | | | | |
|---|---|---|---|---|
| 2019/0061531 | A1* | 2/2019 | Harrington | H02P 3/26 |
| 2019/0326764 | A1* | 10/2019 | Gu | H02J 7/94 |
| 2020/0062139 | A1 | 2/2020 | Fauri | |
| 2022/0250755 | A1 | 8/2022 | Hull et al. | |
| 2022/0289395 | A1 | 9/2022 | Matsumoto et al. | |
| 2022/0306307 | A1 | 9/2022 | Tsutsumi et al. | |
| 2022/0344968 | A1 | 10/2022 | Schildt et al. | |
| 2023/0170693 | A1* | 6/2023 | Demont | H02J 7/50 307/86 |
| 2024/0162520 | A1* | 5/2024 | Tulsyan | H01M 10/425 |

* cited by examiner

APPARATUS FOR CONTROLLING POWER AND METHOD THEREOF

CROSS-REFERENCE TO RELATED APPLICATION

This application claims the benefit of priority to Korean Patent Application No. 10-2023-0055556, filed in the Korean Intellectual Property Office on Apr. 27, 2023, the entire contents of which are incorporated herein by reference.

TECHNICAL FIELD

The present disclosure relates to a power control device and method thereof, and more particularly, to a technology for selectively using a specific battery among various types of batteries according to a driving condition of a traveling device (e.g., an aircraft) in consideration of characteristics of the battery.

BACKGROUND

An aircraft may travel using various types of resources. For example, an electric aircraft may travel using power supplied through at least one battery.

As the need for aircrafts spreads, technologies for using air vehicles in various environments have been developed. For example, in order to allow an aircraft to travel in the city, an electric aircraft equipped with an eco-friendly power train and capable of using battery power as a power source has been actively developed.

A battery used as a power source of an aircraft may be implemented in various types. For example, an electric aircraft may be driven through a motor driven by using the output of a lithium battery.

However, if the driving of an aircraft is controlled without properly considering the characteristics of a battery, power is not efficiently supplied and the weight of the aircraft is excessively increased. For example, in an aircraft using a lithium battery, if driving is uniformly controlled in all driving modes (or driving environments, e.g., a take-off, landing or cruise mode) without properly considering the characteristics of a lithium battery in which power density and energy density are in a trade-off relationship, power may be consumed inefficiently.

SUMMARY

According to the present disclosure, a device for controlling power of an aircraft, the device may comprise: at least one first battery; a second battery having a lower power density and higher energy density than the at least one first battery; at least one lift motor connected, via a first electrical path, to the at least one first battery; a cruise motor connected, via a second electrical path, to the second battery; and a power control circuit configured to control the at least one first battery, the second battery, the at least one lift motor, and the cruise motor, wherein the power control circuit includes: the first electrical path, wherein the first electrical path comprises at least one of: at least one first main relay, first pre-charge relay, a first pre-charge resistor, or a first balance relay; the second electrical path, wherein the second electrical path comprises at least one of: at least one second main relay, a second pre-charge relay, or a second pre-charge resistor; and a third electrical path between the second battery and the at least one lift motor, the third electrical path comprising at least one of: a DC/DC converter, or a third main relay.

Based on a time before the aircraft takes off, the at least one first battery may be configured to output a minimum value via at least one of the first pre-charge relay, the first pre-charge resistor, the first balance relay, or the at least one first main relay. The device may further comprise an inverter and a capacitor connected to the at least one lift motor. Based on a time before the aircraft takes off, the at least one first battery may be configured to charge the capacitor via at least one of the at least one first main relay, the first pre-charge relay, or the first pre-charge resistor.

The second battery and the at least one lift motor are connected to each other via at least one of the DC/DC converter or the third main relay. Based on a time when the aircraft takes off or lands, the at least one first battery may be configured to supply output power to the at least one lift motor via the at least one first main relay, or the second battery may be configured to supply output power to the at least one lift motor via at least one of the third main relay or the DC/DC converter.

Based on a value of the output power of the at least one first battery not satisfying a first threshold value, or a value of output power of the device for landing the aircraft not satisfying a second threshold value, the output power of the at least one first battery and the output power of the second battery may be supplied to the at least one lift motor. The device may further comprise a cruise inverter and a capacitor connected to the cruise motor.

The capacitor may be configured to be charged, based on the aircraft entering a cruise state after completing takeoff, with an output power of the second battery via the at least one second main relay. The cruise motor may be configured to be driven using an output power of the capacitor charged by the second battery. Based on a time before the aircraft takes off, the third electrical path is configured to have a connection state, and based on the cruise motor being driven, the third electrical path may be configured to maintain the same connection state.

Based on a time after the aircraft takes off (e.g., with about 10 seconds after the aircraft takes off), the at least one lift motor may be configured to supply a charging current, generated by regenerative braking of the at least one lift motor, to the at least one first battery via the at least one first main relay. The third electrical path may comprise a diode configured to block supply of the charging current to the second battery. Based on a time when the aircraft is landing, the at least one lift motor may be configured to be driven via at least a portion of the charging current.

The power control circuit may further include a pyro switch associated with at least one of the at least one first battery or the second battery, and based on occurrence of an error in the at least one of the first battery or the second battery, the power control circuit may be further configured to operate the pyro switch to block power supply to the at least one of the first battery or the second battery.

According to the present disclosure, a method for controlling power of an aircraft, the method may comprise: before the aircraft takes off, setting, by a power control device, an output power of at least one first battery to a minimum value by using at least one of a first pre-charge relay, a first pre-charge resistor, a first balance relay, or at least one first main relay; before the aircraft takes off, charging, by the power control device, a capacitor with the output power of the at least one first battery by using at least one of the at least one first main relay, the first pre-charge relay, or the first pre-charge resistor; and connecting, by the power control device, a second battery and at least one lift motor by using at least one of a DC/DC converter or a third main relay, wherein the second battery has a lower power density and higher energy density than the at least one first battery, and the at least one lift motor is connected to the at least one first battery.

The method may further comprise: for taking off or landing the aircraft: supplying, by the power control device, the output power of the at least one first battery to the at least one lift motor by using the at least one first main relay; or supplying the output power of the second battery to the at least one lift motor by using at least one of the third main relay or the DC/DC converter. The method may further comprise: based on a value of the output power of the at least one first battery not satisfying a first threshold value, or a value of power for landing the aircraft not satisfying a second threshold value, supplying, by the power control device, the output power of the at least one first battery and the output power of the second battery to the at least one lift motor. The method may further comprise: charging, by the power control device and based on the aircraft entering a cruise state after completing takeoff, the capacitor with the output power of the second battery via at least one second main relay.

The method, wherein the power control device includes a power control circuit connected with the at least one first battery, the second battery, the at least one lift motor, and a cruise motor, may further comprise: controlling, by the power control circuit, at least one of the at least one first main relay, the first pre-charge relay, the first pre-charge resistor, or the first balance relay, wherein the at least one of the at least one first main relay, the first pre-charge relay, the first pre-charge resistor, or the first balance relay is arranged on a first electrical path between the at least one first battery and the at least one lift motor; controlling, by the power control circuit, at least one of at least one second main relay, a second pre-charge relay, or a second pre-charge resistor, wherein the at least one of the at least one second main relay, the second pre-charge relay, or the second pre-charge resistor is arranged on a second electrical path between the second battery and the cruise motor; and controlling, by the power control circuit, at least one of the DC/DC converter or the third main relay, wherein the at least one of the DC/DC converter or the third main relay is arranged on a third electrical path between the second battery and the at least one lift motor.

BRIEF DESCRIPTION OF THE DRAWINGS

The above and other objects, features and advantages of the present disclosure will be more apparent from the following detailed description taken in conjunction with the accompanying drawings.

With regard to description of drawings, the same or similar elements may be marked by the same or similar reference numerals.

DETAILED DESCRIPTION

Figure 1:
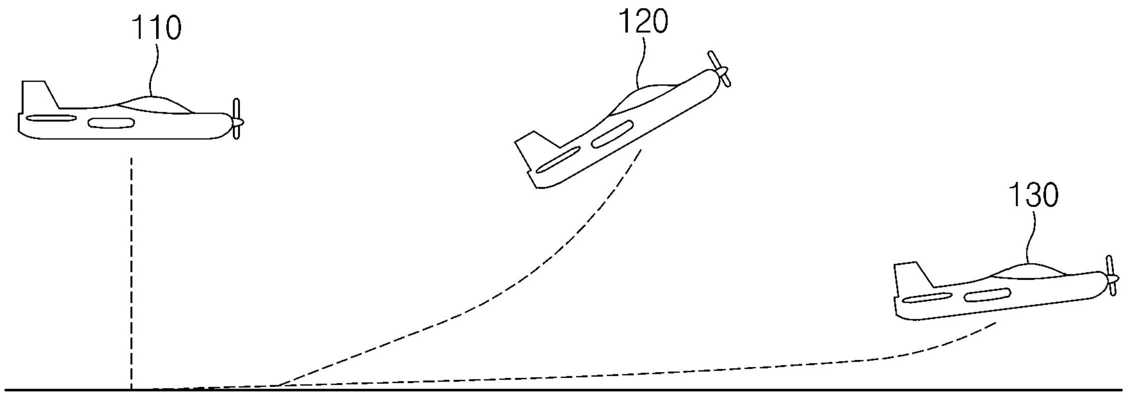
FIG. 1 shows an example of types of take-off and landing of an aircraft.

Hereinafter, some examples of the present disclosure will be described in detail with reference to the exemplary drawings. In adding the reference numerals to the components of each drawing, it should be noted that the identical or equivalent component is designated by the identical numeral even if they are displayed on other drawings. Further, in describing the example of the present disclosure, a detailed description of the related known configuration or function will be omitted if it is determined that it interferes with the understanding of the example of the present disclosure.

In describing the components of the example according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, examples of the present disclosure will be described in detail with reference to FIGS. 1 to 12.

FIG. 1 shows an example of types of take-off and landing of an aircraft.

An aircraft may perform takeoff and/or landing based on various schemes.

Referring to reference numeral 110, according to an example, an aircraft may perform take-off and/or landing based on a vertical take-off and landing (VTOL) scheme. For example, the VTOL scheme may refer to a scheme in which an aircraft performs vertical take-off and/or landing in a vertical direction.

Referring to reference numeral 120, according to an example, an aircraft may perform take-off and/or landing based on a short take-off and landing (STOL) scheme. For example, the STOL scheme may refer to a method in which an aircraft takes off and/or lands on a relatively short runway.

Referring to reference numeral 130, according to an example, an aircraft may perform take-off and/or landing based on a conventional take-off and landing (CTOL) scheme. For example, the CTOL scheme may be a general type of take-off and/or landing scheme in which an aircraft takes off and/or lands after taxiing a certain distance.

Figure 2:
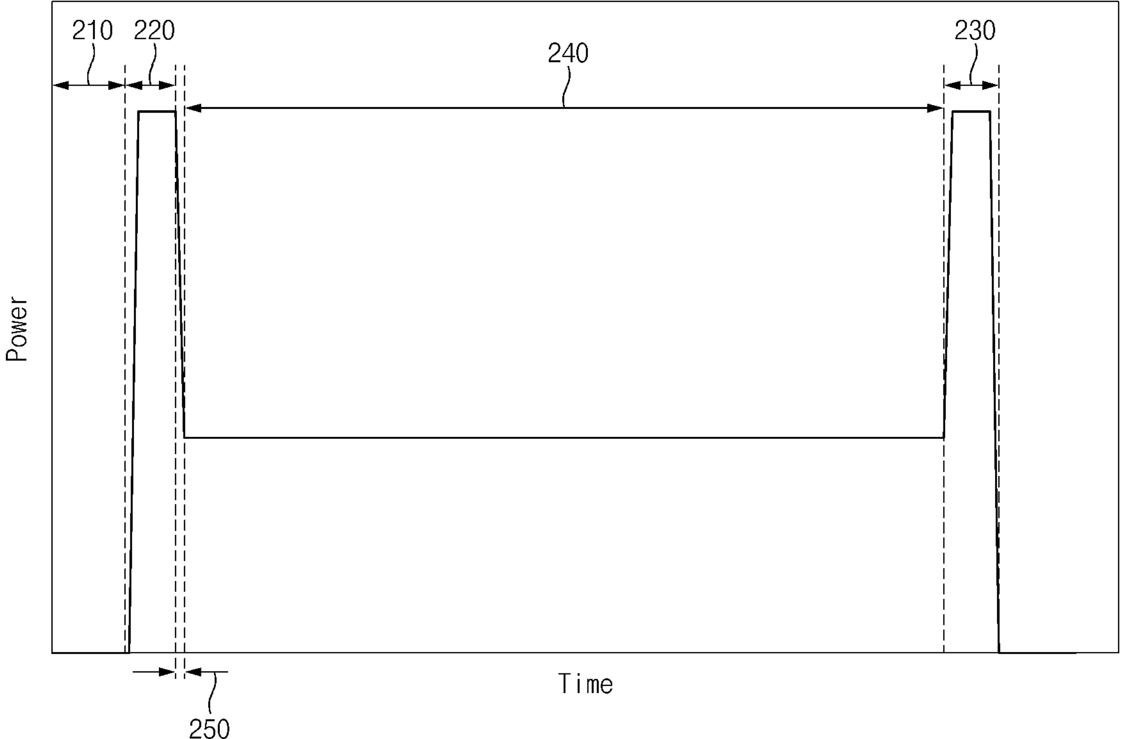
FIG. 2 shows an example of the magnitude of an output power applied according to the flight state of an aircraft.

FIG. 2 shows an example of the magnitude of an output power for the flight state of an aircraft.

Referring to the graph of FIG. 2, according to an example, an aircraft may require different voltage levels (or power) according to a mission (e.g., a flight state). For example, in an electric aircraft that flies using electrical energy, referring to reference numeral 210, in a stage before an aircraft takes off, the voltage for operating the aircraft may be '0 (zero)', but this is an example and it may be understood that a relatively low voltage level may be used.

Referring to time intervals 220 and 230, a high-level voltage may be momentarily applied during take-off or landing of an aircraft. For example, a high positive voltage may be momentarily applied for take-off of an aircraft from the starting point of reference number 220. For example, a high positive voltage may be momentarily applied for landing of an aircraft from the starting point of the time interval 230.

Referring to a time interval 240, a relatively low-level voltage may be applied while the vehicle is traveling (or flying) in a cruise mode. For example, while the aircraft is traveling in the cruise mode, a voltage lower than that, for a take-off or landing stage of the aircraft, may be applied. As an example, the cruise mode may include an operating mode in which an aircraft is in flight at a constant speed after taking off.

Referring to a time interval 250, after the aircraft has completed takeoff and before entering cruise mode, regenerative braking may occur in the process of decelerating a motor for takeoff (e.g., at least one lift motor), a battery having a high power density may be charged using energy generated by regenerative braking.

Figure 3:
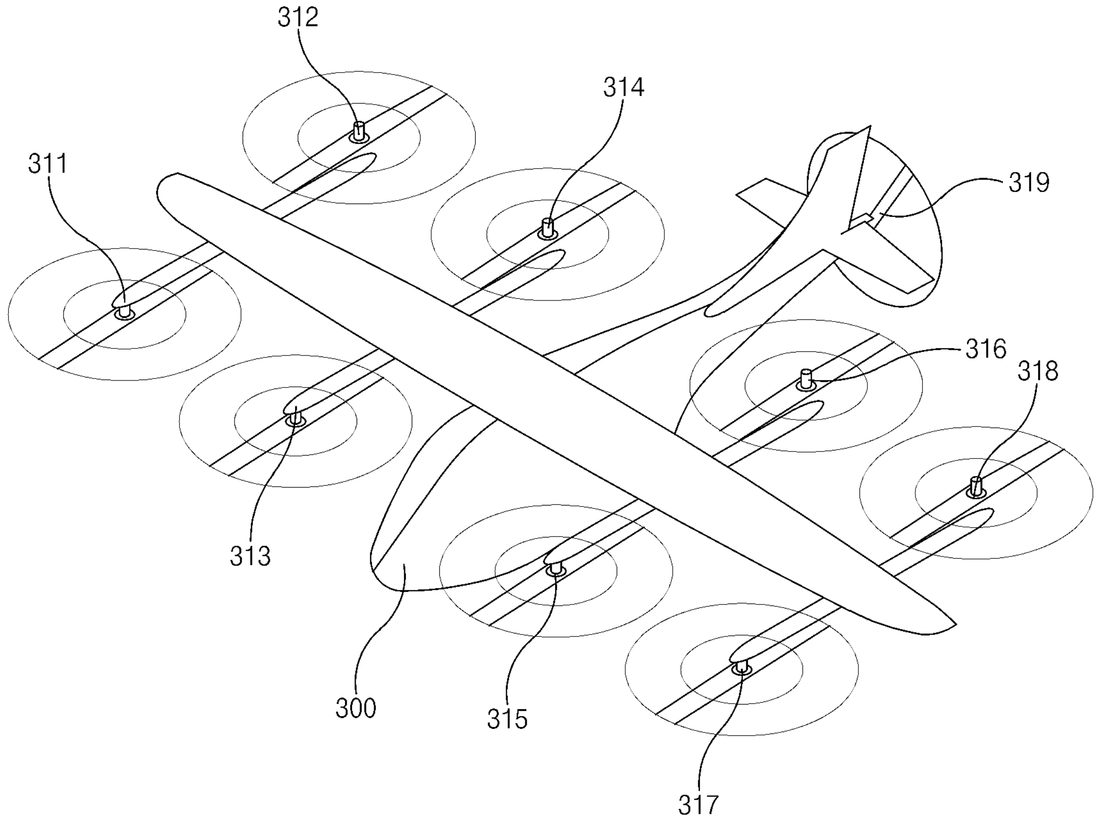
FIG. 3 shows an example of the appearance of an aircraft.

FIG. 3 shows an example of the appearance of an aircraft.

According to an example, an aircraft 300 may include at least one motor.

For example, the aircraft 300 may include at least one lift motor 311, 312, 313, 314, 315, 316, 317, and 318 used for takeoff and/or landing. For example, some of the at least one lift motor may be used even if the aircraft 300 is driven in a cruise mode.

For example, the aircraft 300 may include a cruise motor 319 used for cruise mode driving. For example, the cruise motor may be used for takeoff and/or landing of the aircraft 300.

Figure 4:
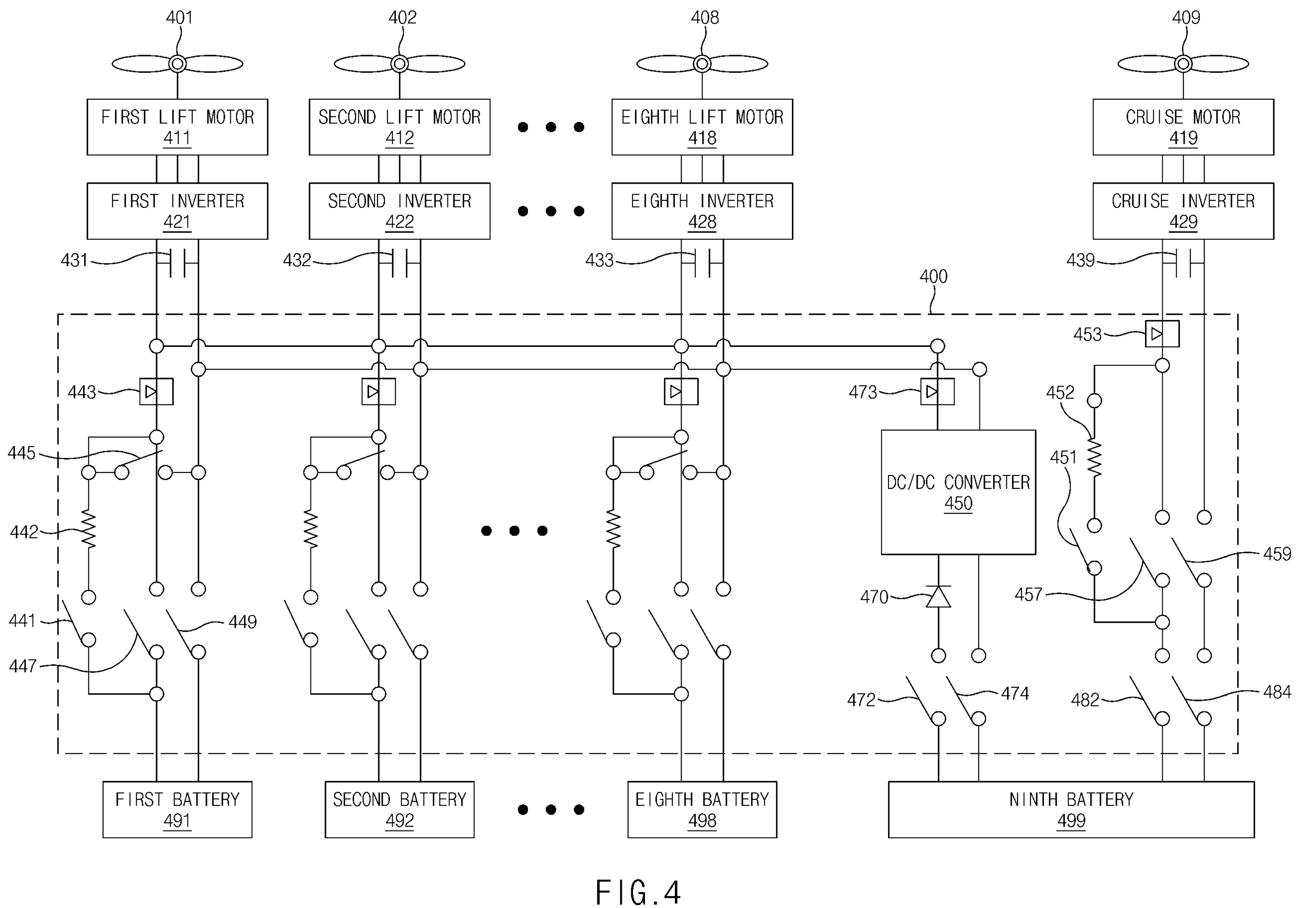
FIG. 4 shows an example of components of a power control device.

FIG. 4 shows an example of components of a power control device.

According to an example, a power control device may include at least one battery.

For example, a power control device may include a first group of eight batteries including a first battery 491, a second battery 492, . . . , and an eighth battery 498. For example, the number of batteries in the first group (e.g., 8) is exemplary, and examples of the present disclosure are not limited thereto.

For example, the power control device may further include a ninth battery 499 having characteristics different from those of the batteries included in the first group of batteries. For example, the ninth battery 499 may have lower power density and higher energy density than the batteries included in the first group of batteries.

According to an example, a power control device may include at least one motor.

For example, the power control device may include a first group of eight lift motors including a first lift motor 411, a second lift motor 412, . . . , and an eighth lift motor 418. For example, the lift motors of the first group may rotate a first propeller 401, a second propeller 402, . . . , and an eighth propeller 408, respectively. The aircraft may travel based on the rotation of a propeller. For example, the first group of lift motors may include a motor used if an aircraft takes off and/or lands. The number (e.g., 8) of lift motors in the first group is exemplary, and examples of the present disclosure are not limited thereto.

For example, the power control device may include a cruise motor 419. For example, the cruise motor 419 may rotate a cruise propeller 409. The aircraft may travel based on the rotation of the propeller. For example, the cruise motor 419 may include a motor used if the aircraft travels in a cruise mode.

According to an example, a power control device may include at least one inverter.

For example, the power control device may include a first group of eight inverters including a first inverter 421, a second inverter 422, . . . , and an eighth inverter 428. For example, the first group of inverters may electrically connect the first group of lift motors and a power control circuit 400, respectively. The number of inverters in the first group (e.g., 8) is exemplary, and examples of the present disclosure are not limited thereto.

For example, the power control device may include a cruise inverter 429. For example, the cruise inverter 429 may electrically connect the cruise motor 419 and the power control circuit 400.

According to an example, the power control device may include at least one capacitor.

For example, the power control device may include a first group of eight capacitors including a first capacitor 431, a second capacitor 432, . . . , and an eighth capacitor 433. For example, the first group of capacitors may be arranged between the first group of inverters and the power control circuit 400, respectively. The number (e.g., 8) of capacitors in the first group is exemplary, and examples of the present disclosure are not limited thereto.

For example, the power control device may include a cruise capacitor 439. For example, the cruise capacitor 439 may electrically connect the cruise inverter 429 and the power control circuit 400.

According to an example, a power control device may include the power control circuit 400 including a plurality of elements.

For example, the power control circuit 400 may be operatively connected with the first group of batteries 491, 492, . . . , and 498, the ninth battery 499, the first group of lift motors 411, 412, . . . , and 418, and the cruise motor 419.

For example, the power control circuit 400 may include at least one of at least one first main relays 447 and 449, a first pre-charge relay 441, a first pre-charge resistor 442, a first pyro switch 443, a first balance relay 445, which are arranged on an electrical path between the first battery 491 and the first lift motor 411 or a combination thereof. Although not represented by reference numerals in FIG. 4, components, which are substantially the same as at least one of first main relays 447 and 449, the first pre-charge relay 441, the first pre-charge resistor 442, a first pyro switch 443, the first balance relay 445, or a combination thereof, may be arranged between the first group of batteries 491, 492, . . . , and 498 and the first group of lift motors 411, 412, . . . , and 418, respectively. For example, an electrical path between the first group of batteries 491, 492, . . . , and 498 and the first group of lift motors 411, 412, . . . , and 418 may be defined as a first electrical path.

For example, the power control circuit 400 may include at least one of at least one second main relay 457 or 459, a second pre-charge relay 451, a second pre-charge resistor

452, a second pyro switch 453, which are arranged on an electrical path between the ninth battery 499 and the cruise motor 419, or a combination thereof. For example, the power control circuit 400 may further include at least one additional or alternative main relay 482 or 484 arranged on an electrical path between the ninth battery 499 and the cruise motor 419. For example, the electrical path between the ninth battery 499 and the cruise motor 419 may be defined as a second electrical path.

For example, the power control circuit 400 may include a DC/DC converter 450 arranged between the ninth battery 499 and the first group of lift motors 411, 412, . . . , and 418, at least one third main relay 472 or 474, a third pyro switch 473, a diode 470, or a combination thereof. For example, an electrical path between the ninth battery 499 and the first group of lift motors 411, 412, . . . , and 418 may be defined as a third electrical path.

The configuration of the power control device shown in FIG. 4 is exemplary, and examples of the present disclosure are not limited thereto. For example, the power control device may further include components (e.g., a second cruise motor and a tenth battery) not shown in FIG. 4 or may not include at least some of the components shown.

Hereinafter, with reference to FIGS. 5 to 10, components of the power control device and a process of controlling at least one motor by the power control device will be described. In FIGS. 5 to 10, the same or similar reference numerals will be used for the same or similar components, and descriptions overlapping those of FIG. 4 will be omitted from descriptions of corresponding components.

Figure 5:
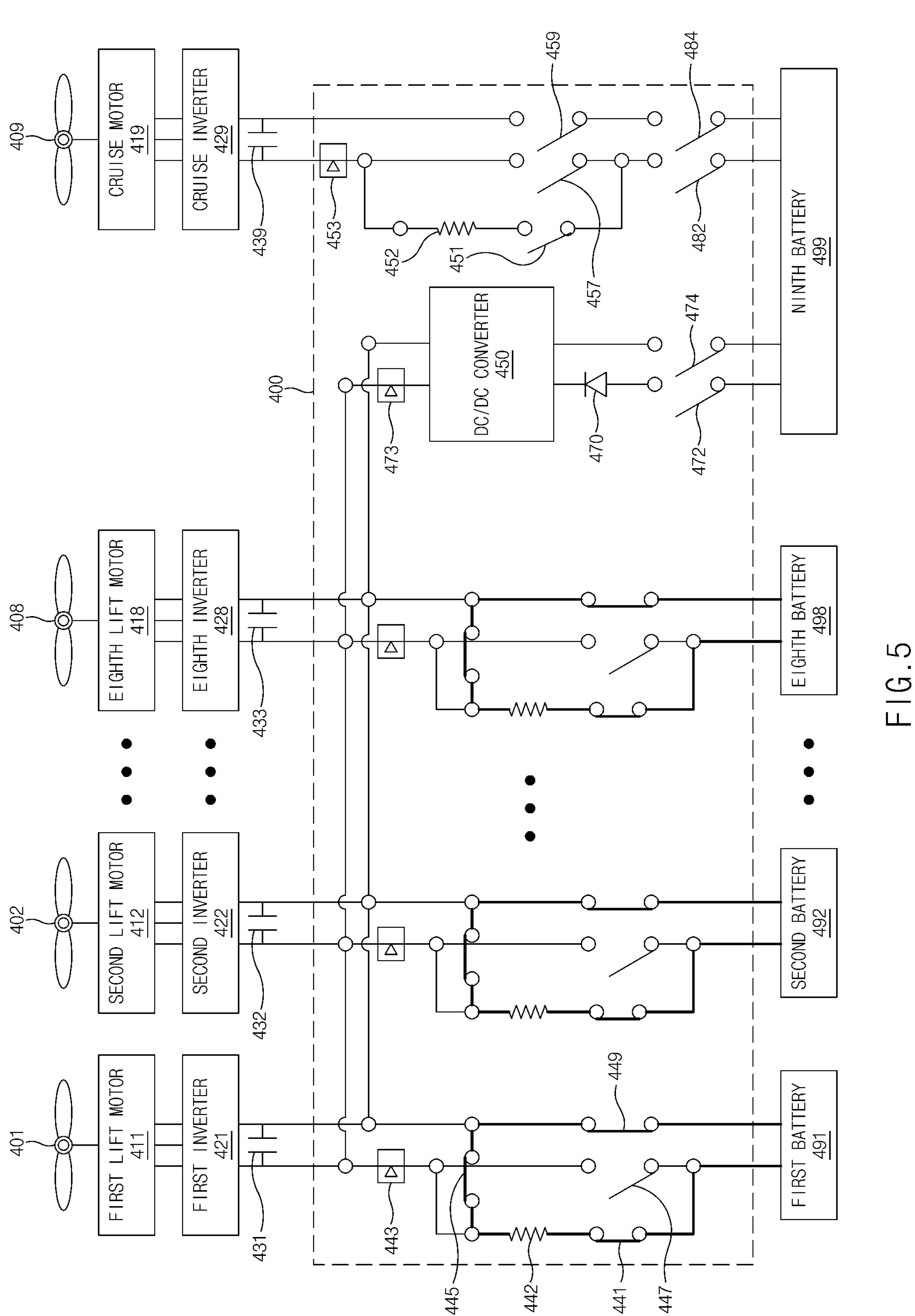
FIG. 5 shows an example of components and power flow of a power control device.

FIG. 5 shows an example of components and power flow of a power control device.

According to an example, the power control device may substantially equally set the voltage of each of the first group of batteries 491, 492, . . . , and 498 connected in parallel based on the power flow drawn with a bold line. An operating mode of the power control device according to the example of FIG. 5 may be defined as a battery pack balancing mode.

For example, before the aircraft takes off, the power control device may set the minimum value among voltages of the batteries 491, 492, . . . , and 498 in the first group as the output powers of the batteries 491, 492, . . . , and 498 in the first group by using the first pre-charge relay 441, the first pre-charge resistor 442, the first balance relay 445, and at least one first main relay 447 or 449, or a combination thereof.

For example, as shown in FIG. 5, the power control device may turn off the (1-1)-th main relay 447 of at least one first main relay 447 or 449, turn on the (1-2)-th main relay 449, turn on the first pre-charge relay 441, and turn on the first balance relay 445, such that the voltages between the batteries 491, 492, . . . , and 498 of the first group connected in parallel to each other may be set to be the same before the aircraft takes off.

For example, if the voltages of the first group of batteries 491, 492, . . . , and 498 are all equally set, the power control device may turn off the balance relays included in the power control circuit 400.

Although an example using the components between the first lift motor 411 and the first battery 491 is disclosed in description of FIG. 5 the above, the example may be substantially identically implemented using components between the second lift motor 412 to the eighth lift motor 418 and the second battery 492 to the eighth battery 498.

Figure 6:
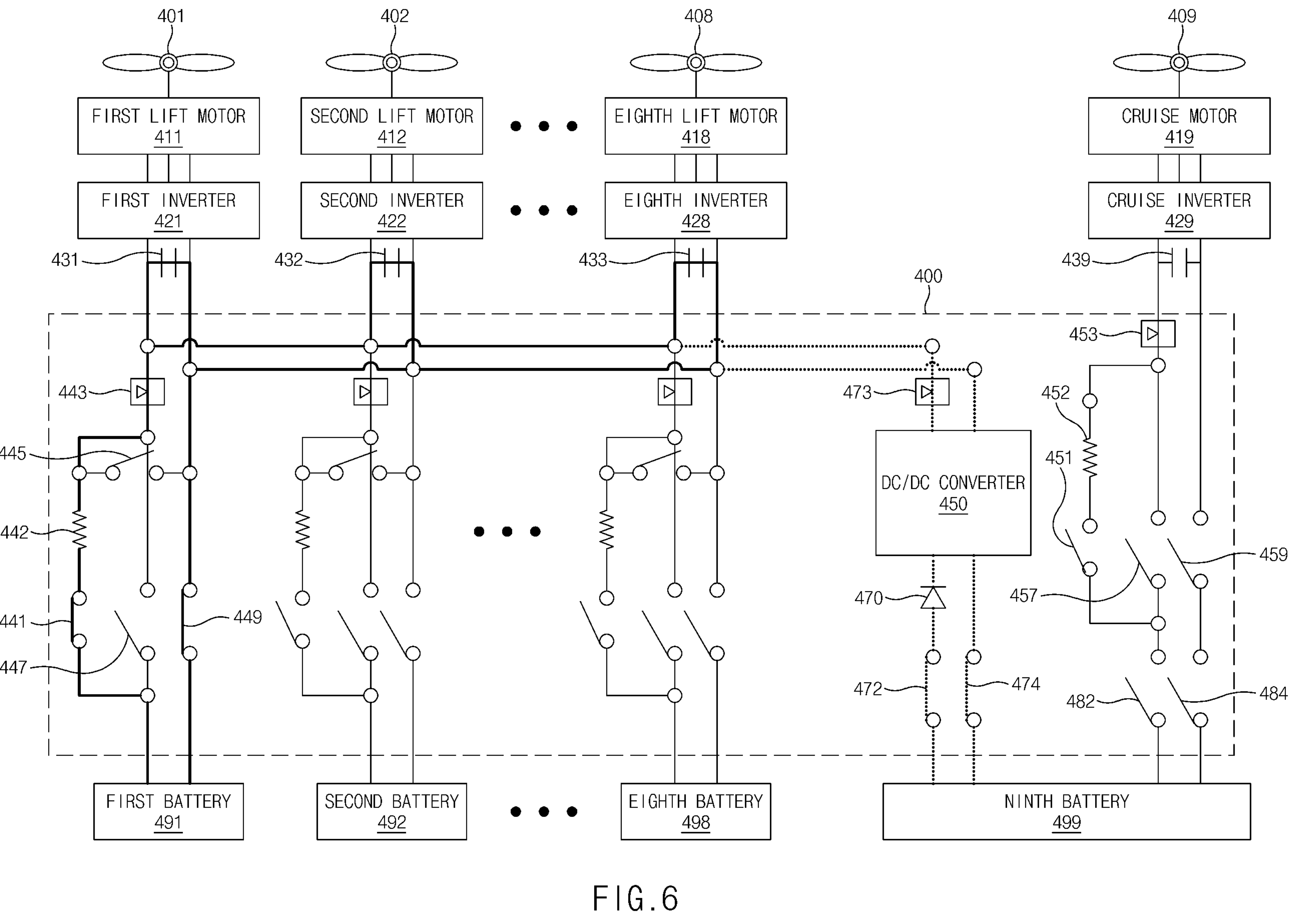
FIG. 6 shows an example of components and a power flow of a power control device.

FIG. 6 shows an example of components and a power flow of a power control device.

According to an example, a power control device may charge the first group of capacitors 431, 432, . . . , and 433, which are connected to the first group of lift motors 411, 412, . . . , and 418, respectively, based on the power flow drawn with a bold line, thereby equalizing the voltage of each capacitor. An operating mode of the power control device according to the example of FIG. 6 may be defined as a pre-charging mode.

For example, before the aircraft takes off, the power control device may charge the first group of capacitors 431, 432, . . . , and 433 with the respective output powers of the first group batteries 491, 492, . . . , and 498 by using at least one of the first pre-charge relay 441, the first pre-charge resistor 442, and at least one first main relay 447 or 449, or a combination thereof.

For example, as shown in FIG. 6, the power control device may turn off the (1-1)-th main relay 447 of at least one first main relay 447 or 449, turn on the (1-2)-th main relay 449, turn on the first pre-charge relay 441, and turn off the first balance relay 445, such that the first group of capacitors 431, 432, . . . 433 may be charged with the respective output powers of the first group of batteries 491, 492, . . . , and 498.

For example, the power control device may further use at least one of the DC/DC converter 450, at least one of the third main relays 472 and 474, or a combination thereof to operatively connect the ninth battery 499 and the first group of lift motors 411, 412, . . . , and 418.

Although an example using the components between the first lift motor 411 and the first battery 491 is disclosed in the description of FIG. 6 above, the example may be substantially identically implemented using components between the second lift motor 412 to the eighth lift motor 418 and the second battery 492 to the eighth battery 498.

Figure 7:
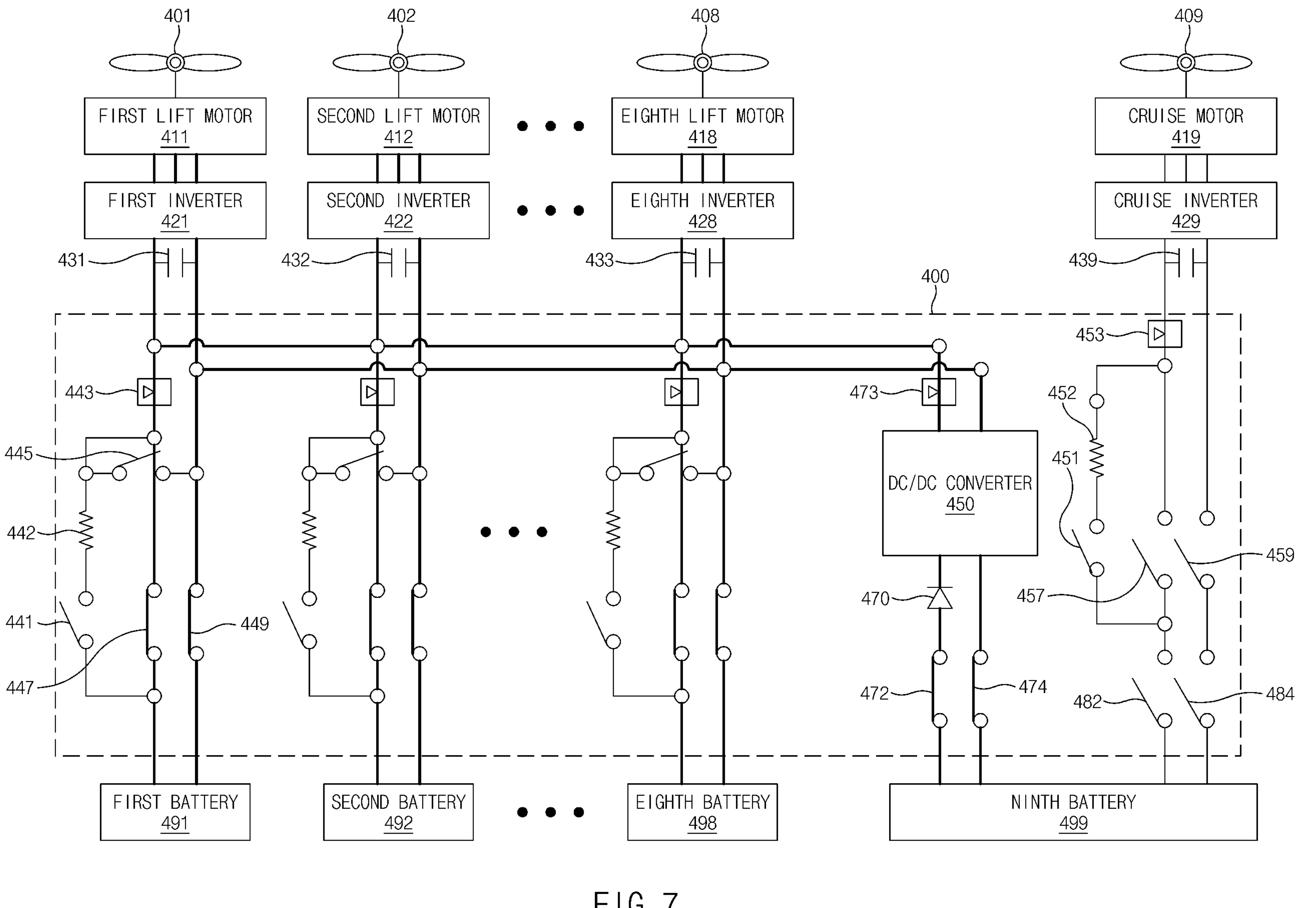
FIG. 7 shows an example of components and a power flow of a power control device.

FIG. 7 shows an example of components and a power flow of a power control device.

According to an example, the power control device may control the take-off and/or landing of the aircraft by rotating the first group of lift motors 411, 412, . . . , and 418 based on the power flow drawn with a bold line. An operation mode of the power control device according to the example of FIG. 7 may be defined as a hybrid mode.

For example, if the aircraft takes off or lands, the power control device may supply the output power of the first battery 491 to the first lift motor 411 by using at least one of the first main relays 447 and 449. For example, if the aircraft takes off or lands, the power control device may supply the output power of the ninth battery 499 to the first lift motor 411 by using at least one of at least one of the third main relays 472 and 474, the DC/DC converter 450, or a combination thereof.

For example, as shown in FIG. 7, the power control device may turn on at least one of the first main relays 447 and 449 and turn off the first pre-charge relay 441 and the first balance relay 445 to supply the output power of the first battery 491 to the first lift motor 411, or may turn on at least one of the third main relays 472 and 474 to supply the output power of the ninth battery 499 to the first lift motor 411.

For example, the power control device converts the output power of the ninth battery 499 to be equal to the output powers of the first group batteries 491, 492, . . . , and 498 by using the DC/DC converter 450.

For example, if the output power of the first group of batteries 491, 492, . . . , and 498 is insufficient for take-off and/or landing of an aircraft, or to secure backup power for the landing of the aircraft, the power control device may convert the output power of the ninth battery 499 to be equal to that of the first group batteries 491, 492, . . . , and 498 by using the DC/DC converter 450.

For example, if the output power of the first group of batteries 491, 492, . . . , and 498 is below a specified value, or the power for landing of the aircraft is insufficient, the power control device may supply the output power of the first group of batteries 491, 492, . . . , and 498 and the output power of the ninth battery 499 to the first group of lift motors 411, 412, . . . , and 419.

Although an example using the components between the first lift motor 411 and the first battery 491 is disclosed in the description of FIG. 7 above, the example may be substantially identically implemented using components between the second lift motor 412 to the eighth lift motor 418 and the second battery 492 to the eighth battery 498.

Figure 8:
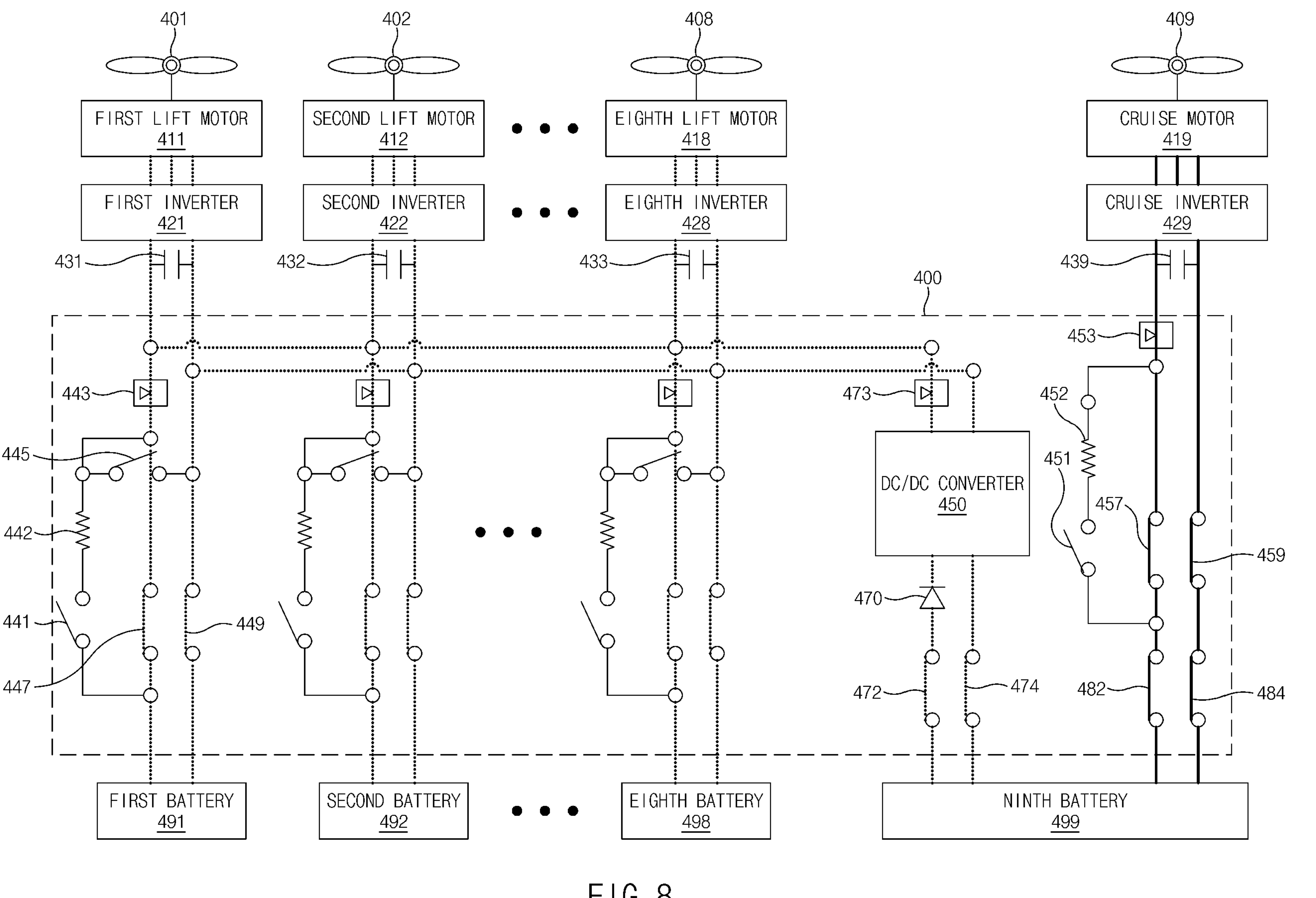
FIG. 8 shows an example of components and a power flow of a power control device.

FIG. 8 shows an example of components and a power flow of a power control device.

According to an example, a power control device may rotate the cruise motor 419 based on the power flow drawn with a bold line, thereby controlling driving if an aircraft enters a cruise state after completing take-off. An operating mode of the power control device according to the example of FIG. 8 may be defined as a stand-alone mode.

For example, the power control device may charge the cruise capacitor 439 with the output power of the ninth battery 499 by using at least one of the second main relays 457 and 459 if the aircraft travels in a cruise state after completing takeoff.

For example, the power control device may drive the cruise motor 419 by using the output power of the ninth battery 499 charged in the cruise capacitor 439. For example, the cruise propeller 409 may rotate based on driving of the cruise motor 419.

For example, while the cruise motor 419 is driven, the power control device may maintain the same connection state of the third electrical path as the connection state before the aircraft takes off. In other words, the power control device may maintain the on/off state of the components connected to the first group of lift motors 411, 412, . . . , and 418 among the components of the power control circuit 400 to the state before take-off. In this case, the power control device may not transmit a drive signal to the first group of lift motors 411, 412, . . . , and 418 except for a situation in which an additional or alternative lift of the aircraft may be applied.

For example, as shown in FIG. 8, the power control device may turn on at least one of the second main relays 457 and 459 and at least one of the additional or alternative main relays 482 and 484, and turn off the second pre-charge relay 451 to supply the output power of the ninth battery 499 to the cruise motor 419.

Figure 9:
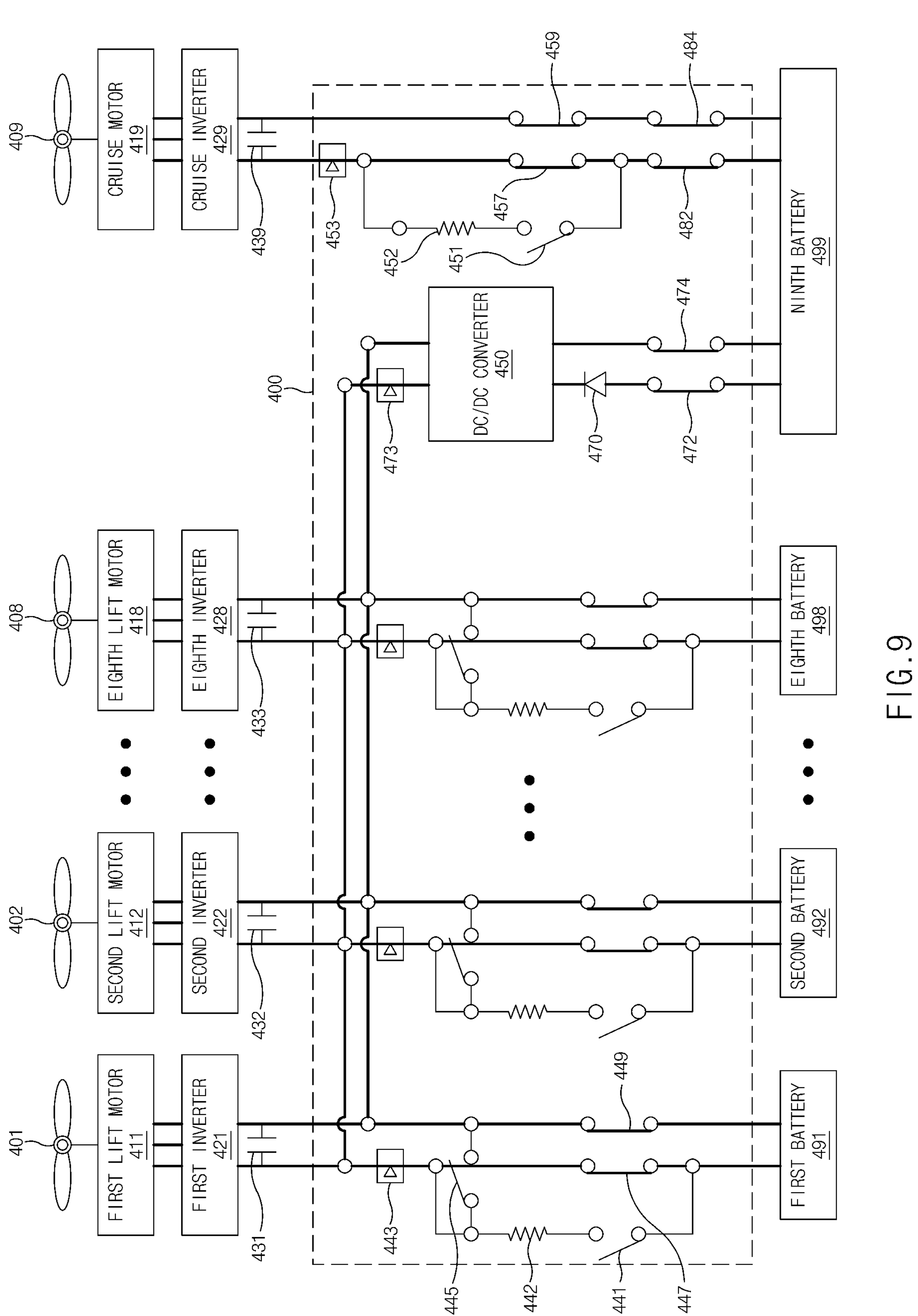
FIG. 9 shows an example of components and a power flow of a power control device.

FIG. 9 shows an example of components and a power flow of a power control device.

According to an example, the first group of lift motors 411, 412, . . . , and 418 may decelerate based on the power flow drawn with a bold line, so that the power control device may charge a battery with the charging current generated by regenerative braking. An operating mode of the power control device according to the example of FIG. 9 may be defined as a regenerative charging mode.

For example, the power control device may supply the charging current generated by regenerative braking of the first group of lift motors 411, 412, . . . , and 418 immediately after the aircraft takes off, to the first group of batteries 491, 492, . . . , and 498 by using at least one of the first main relays 447 and 449.

For example, the power control device may further include a diode 470 arranged between the DC/DC converter 450 and the ninth battery 499 (e.g., a third electrical path). For example, the diode 470 may block supply of charging current generated by regenerative braking of the first group of lift motors 411, 412, . . . , and 418 to the ninth battery 499.

The power control device may turn on at least one of the first main relays 447 and 449 and turn off the first pre-charge relay 441 and the first balance relay 445, such that the charging current generated by regenerative braking of the first group of lift motors 411, 412, . . . , and 418 may be supplied to the first group of batteries 491, 492, . . . , and 498.

For example, the charging current generated by regenerative braking of the first group of lift motors 411, 412, . . . , and 418 may be used to drive the first group of lift motors 411, 412, . . . , and 418 if the aircraft lands.

Although an example using the components between the first lift motor 411 and the first battery 491 is disclosed in the description of FIG. above, the example may be substantially identically implemented using components between the second lift motor 412 to the eighth lift motor 418 and the second battery 492 to the eighth battery 498.

Figure 10:
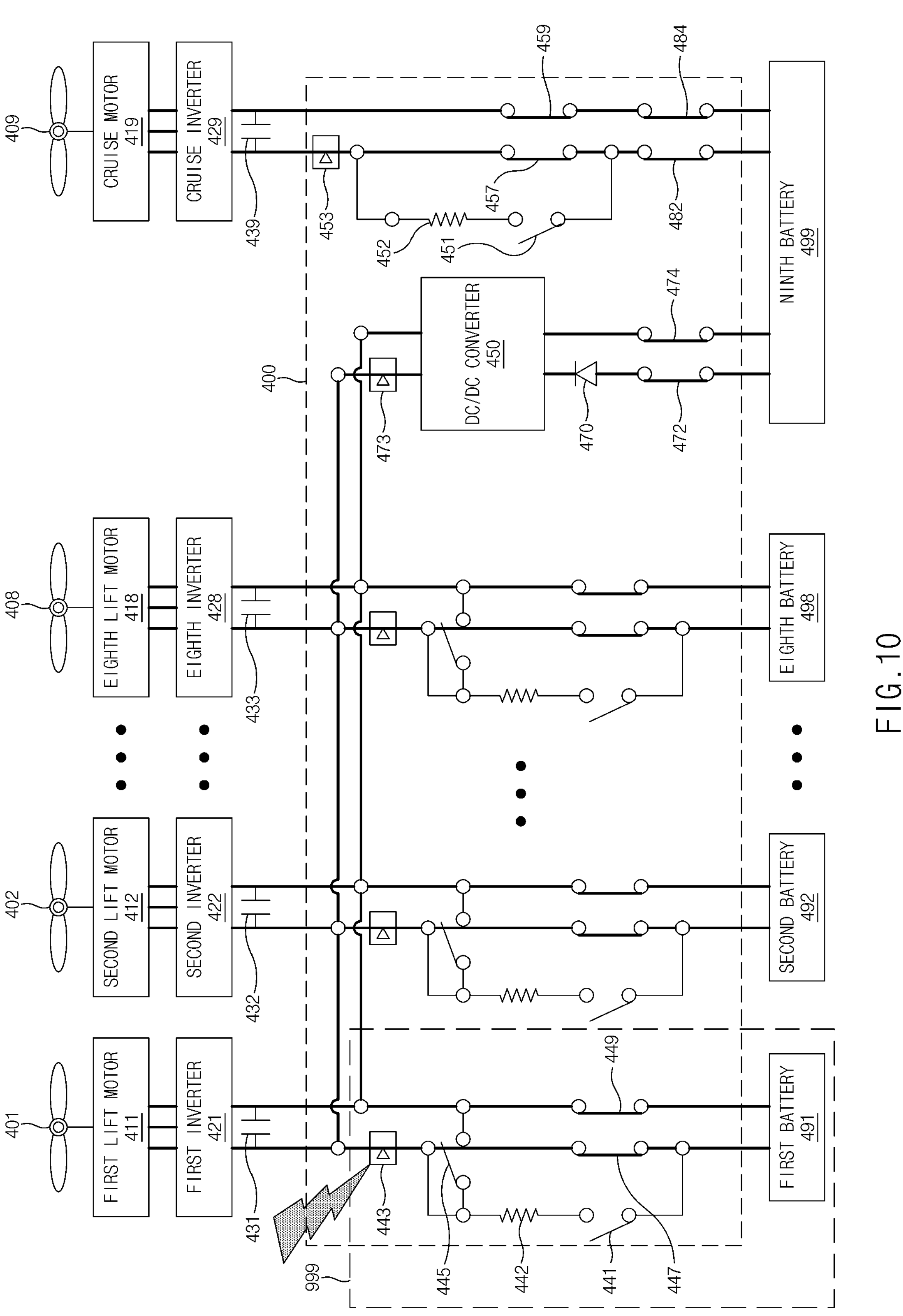
FIG. 10 shows an example of components and a power flow of a power control device.

FIG. 10 shows an example of components and a power flow of a power control device.

According to an example, the power control device may identify in real time a battery in which trouble occurs during operation of an aircraft, and cut off power supply of the identified battery through a pyro-switch. An operation mode of the power control device according to the example of FIG. 10 may be defined as an alert mode.

For example, the power control device may include at least one battery disposed in correspondence with at least one of pyro switches 443, 453 or 473 arranged corresponding to at least one of the first group of batteries 491, 492, . . . , and 498, the ninth battery 499, or a combination thereof.

For example, the power control device may identify that an abnormality has occurred in a specific battery among the first group of batteries 491, 492, . . . , 498, the ninth battery, or a combination thereof. For example, an abnormality of a specific battery may include a case where the supply voltage of the battery is lower than a specified lower limit value (e.g., under-voltage), higher than a specified upper limit value (e.g., over-voltage), or the battery temperature is higher than a specified temperature.

For example, the power control device may operate a pyro switch corresponding to a specific battery among at least one of pyro switches 443, 453 and 473 after identifying a specific battery in which an error occurs.

Referring to reference number 999, according to an example, if it is identified that an error has occurred in the first battery 491, the power control device may operate the first pyro switch 443 arranged corresponding to the first battery 491. If the first pyro switch 443 is operated, power supply of the first battery 491 may be cut off.

Figure 11:
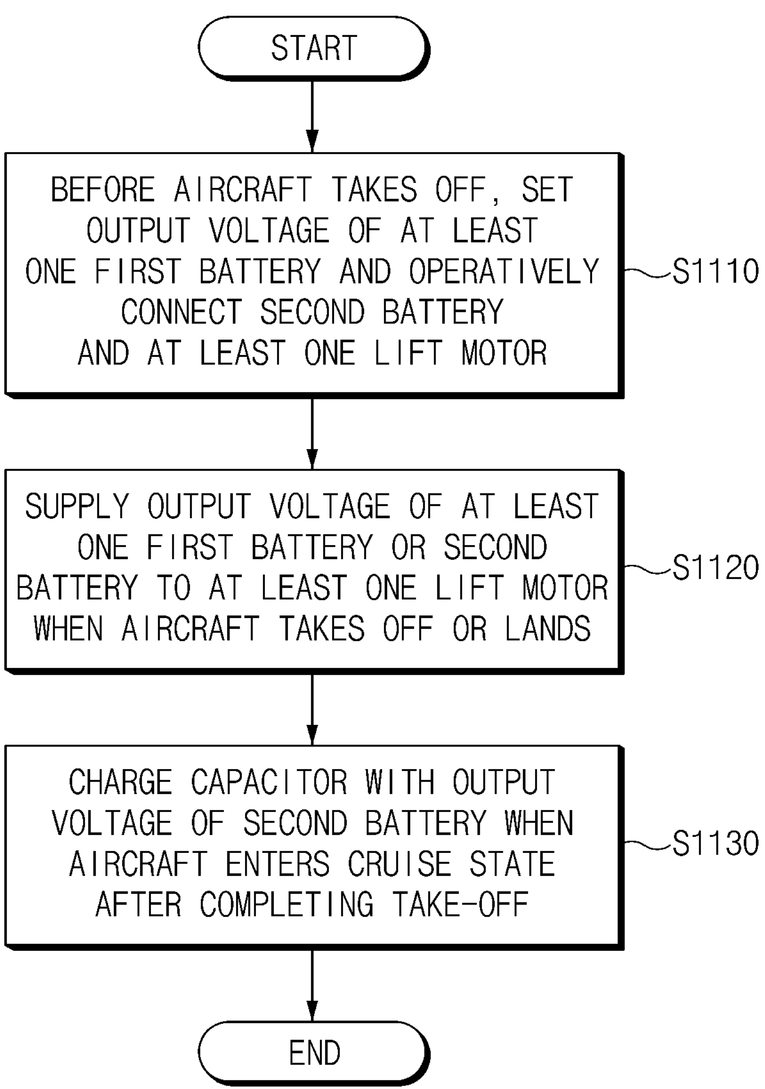
FIG. 11 shows an example of a flowchart showing steps of a power control method.

FIG. 11 shows an example of a flowchart showing steps of a power control method.

According to an example, a power control device (e.g., the power control device of FIG. 4) may perform the operations disclosed in FIG. 11. For example, at least some (e.g., the components of FIG. 4) of the components included in the power control device may be set to perform the operations of FIG. 11.

In the following example, the operations of S1110 to S1130 may be sequentially performed, but are not necessarily sequentially performed. For example, the order of each operation may be changed, or at least two operations may be performed in parallel. Additionally or alternatively, contents corresponding to or overlapping with the contents described above with respect to FIG. 11 will be briefly described or omitted.

According to an example, in S1110, before the aircraft takes off, the power control device may set the output power of at least one first battery (e.g., the first group of batteries 491, 492, . . . , and 498) and operatively connect the second battery (e.g., the ninth battery 499 of FIG. 4) and at least one lift motor (e.g., the first group of lift motors 411, 412, . . . , and 418 of FIG. 4).

For example, the power control device may set the minimum value among voltages of at least one first battery (e.g., the first group of batteries 491, 492, . . . , and 498) as the output power of the at least one first battery by using the first pre-charge relay (e.g., the first pre-charge relay 441 of FIG. 4), the first pre-charge resistor (e.g., the first pre-charge resistor 442 of FIG. 4), the first balance relay (e.g., the first balance relay 445 of FIG. 4), and at least one first main relay (e.g., at least one first main relay 447 or 449 of FIG. 4), or a combination thereof.

For example, before the aircraft takes off, the power control device may operatively connect the second battery (e.g., the ninth battery 499 of FIG. 4) and at least one lift motor by using at least one of the DC/DC converter (e.g., the DC/DC converter 450 of FIG. 4), at least one third main relay (e.g., at least one third main relay 472 or 474 of FIG. 4), or a combination thereof.

According to an example, in S1120, the power control device may supply the output power of at least one first battery or a second battery to at least one lift motor if an aircraft takes off or lands.

For example, if an aircraft takes off or lands, the power control device may supply the output power of the first battery (e.g., the first battery 491 of FIG. 4) to the first lift motor (e.g., the first lift motor 411 of FIG. 4) by using at least one first main relay (e.g., the at least one first main relay 447 or 449 of FIG. 4). For example, if an aircraft takes off or lands, the power control device may supply the output power of the ninth battery to the first lift motor by using at least one third main relay, the DC/DC converter, or a combination thereof.

According to an example, in S1130, the power control device may charge the capacitor with the output power of the second battery if the aircraft enters a cruise state after completing take-off.

For example, the power control device may charge the cruise capacitor 439 with the output power of the ninth battery by using at least one second main relay (e.g., at least one second main relay 457 or 459 of FIG. 4) if the aircraft travels in the cruise state after completing take-off.

Figure 12:
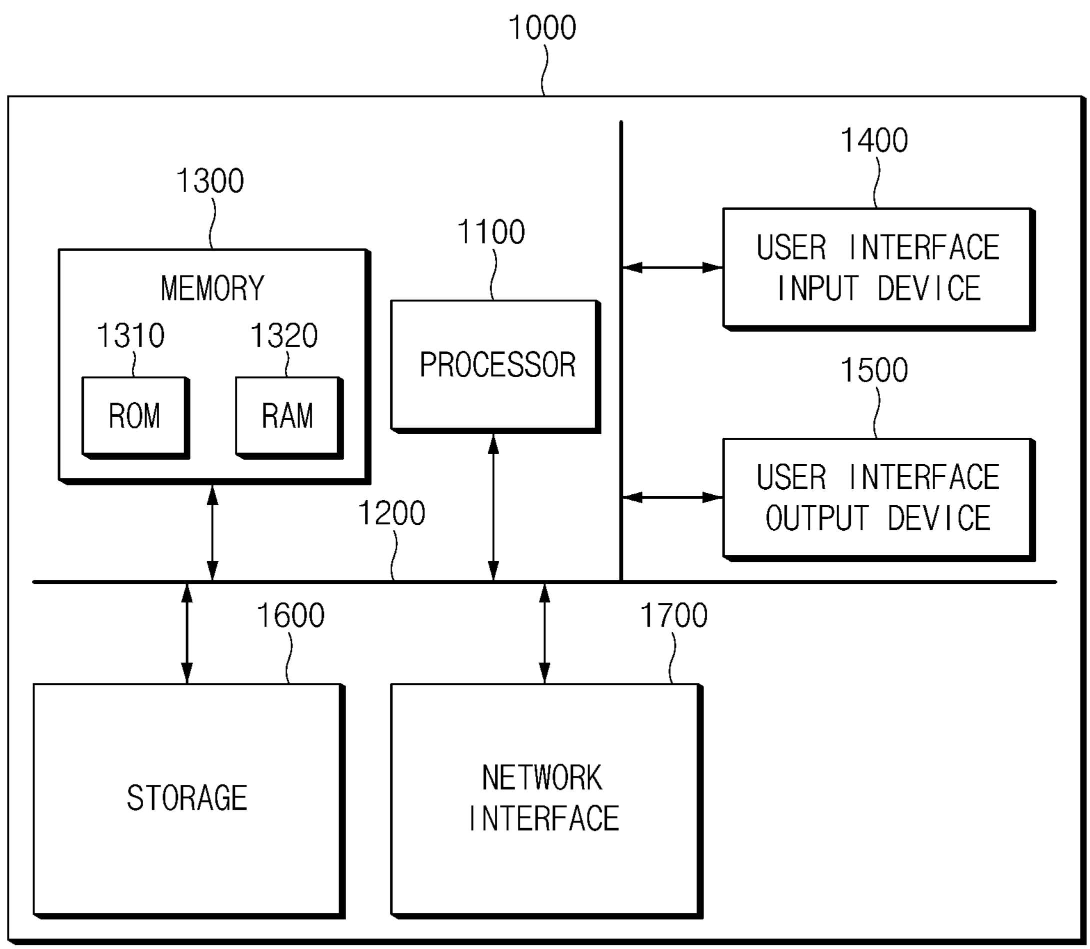
FIG. 12 shows an example of a computing system for executing a method of controlling power.

FIG. 12 shows an example of a computing system for executing a method of controlling power.

Referring to FIG. 12, a computing system 1000 related to a method of controlling power may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the examples of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present disclosure has been made to solve the above-mentioned problems occurring in the prior art while advantages achieved by the prior art are maintained intact.

An example of the present disclosure provides a power control device and method thereof capable of driving a motor (e.g., a lift motor and/or a cruise motor) by selectively using a specific battery among various types of batteries provided in an aircraft in consideration of a driving condition of the aircraft.

Another example of the present disclosure provides a power control device and method thereof capable of controlling an aircraft to perform hybrid driving by using various types of batteries having different power densities and energy densities.

Still another example of the present disclosure provides a power control device and method thereof capable of performing efficient power control by charging a capacitor through an output power of a battery having a high power density if an aircraft enters a cruise state immediately after taking off.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a power control device for an aircraft includes at least one first battery, a second battery having a lower power density and higher energy density than the at least one first battery, at least one lift motor operatively connected to the at least one first battery, a cruise motor operatively connected to the second, and a power control circuit operatively connected with the at least one first battery, the second battery, the at least one lift motor, and the cruise motor, wherein the power control circuit includes at least one of at least one first main relay, a first pre-charge relay, a first pre-charge resistor, a first balance relay, or a combination thereof arranged on a first electrical path between the at least one first battery and the at least one lift motor, at least one of at least one second main relay, a second pre-charge relay, a second pre-charge resistor, or a combination thereof arranged on a second electrical path between the second battery and the cruise motor, and at least one of a DC/DC converter, at least one third main relay, or a combination thereof arranged on a third electrical path between the second battery and the at least one lift motor.

According to an example, before the aircraft takes off, the power control device may set an output power of the at least one first battery to a minimum value among voltages of the at least one first battery by using at least one of the first pre-charge relay, the first pre-charge resistor, the first balance relay, the at least one first main relay, or a combination thereof.

According to an example, the power control device may further include at least one inverter and at least one capacitor operatively connected to the at least one lift motor.

According to an example, before the aircraft takes off, the power control device may charge the at least one capacitor with an output power of the at least one first battery by using at least one of the at least one first main relay, the first pre-charge relay, the first pre-charge or resistor, a combination thereof.

According to an example, the power control device may operatively connect the second battery and the at least one lift motor by using at least one of the DC/DC converter, the at least one third main relay, or a combination thereof.

According to an example, if the aircraft takes off or lands, the power control device may supply an output power of the at least one first battery to the at least one lift motor by using the at least one first main relay, or supply an output power of the second battery to the at least one lift motor by using at least one of the at least one third main relay, the DC/DC converter, or a combination thereof.

According to an example, if the output power of the at least one first battery is less than or equal to a specified value, or power for landing of the aircraft is insufficient, the power control device may supply the output power of the at least one first battery and the output power of the second battery to the at least one lift motor.

According to an example, the power control device may further include a cruise inverter and a capacitor operatively connected to the cruise motor.

According to an example, if the aircraft enters a cruise state after completing takeoff, the power control device may charge the capacitor with the output power of the second battery by using the at least one second main relay.

According to an example, the power control device may drive the cruise motor by using the output power of the second battery charged in the capacitor.

According to an example, the power control device may maintain a connection state of the third electrical path to be the same as a connection state before the vehicle takes off while the cruise motor is driven.

According to an example, the power control device may supply a charging current generated by regenerative braking of the at least one lift motor to the at least one first battery by using the at least one first main relay immediately after the aircraft takes off.

According to an example, the power control device may further include a diode that is arranged on the third electrical path to block supply of the charging current generated by the regenerative braking of the at least one lift motor to the second battery.

According to an example, the power control device may drive the at least one lift motor by using at least a portion of the charging current obtained through the regenerative braking if the aircraft lands.

According to an example, the power control circuit may further include at least one pyro switch arranged corresponding to at least one of the at least one first battery, the second battery, or a combination thereof. For example, the power control device may operate a first pyro switch corresponding to a specific battery among the at least one pyro switch to block power supply of the specific battery if an error occurs in the specific battery among the at least one first battery, the second battery, or a combination thereof.

According to another example of the present disclosure, a power control method for an aircraft includes setting, by a power control device, an output power of at least one first battery to a minimum value among voltages of the at least one first battery by using at least one of a first pre-charge relay, a first pre-charge resistor, a first balance relay, at least one first main relay, or a combination thereof before the aircraft takes off, charging, by the power control device, at least one capacitor is charged with the output power of the at least one first battery by using at least one of the at least one first main relay, the first pre-charge relay, the first pre-charge resistor, or a combination thereof before the aircraft takes off, and operatively connecting, by the power control device, a second battery and at least one lift motor by using at least one of a DC/DC converter, at least one third main relay, or a combination thereof, wherein the second battery has a lower power density and higher energy density than the at least one first battery, and the at least one lift motor is operatively connected to the at least one first battery.

According to an example, the power control method may further include supplying, by the power control device, the output power of the at least one first battery to the at least one lift motor by using the at least one first main relay, or supplying the output power of the second battery to the at least one lift motor by using at least one of the at least one third main relay, the DC/DC converter, or a combination thereof if the aircraft takes off or lands.

According to an example, the power control method may further include supplying, by the power control device, the output power of the at least one first battery and the output power of the second battery to the at least one lift motor if the output power of the at least one first battery is less than or equal to a specified value, or power for landing of the aircraft is insufficient.

According to an example, the power control method may further include charging, by the power control device, the capacitor with the output power of the second battery by using the at least one second main relay if the aircraft enters a cruise state after completing takeoff.

According to an example, the power control device may include a power control circuit operatively connected with the at least one first battery, the second battery, the at least one lift motor, and a cruise motor, wherein the power control circuit includes at least one of at least one first main relay, a first pre-charge relay, a first pre-charge resistor, a first balance relay, or a combination thereof arranged on a first electrical path between the at least one first battery and the at least one lift motor, at least one of at least one second main relay, a second pre-charge relay, a second pre-charge resistor, or a combination thereof arranged on a second electrical path between the second battery and the cruise motor, and at least one of a DC/DC converter, at least one third main relay, or a combination thereof arranged on a third electrical path between the second battery and the at least one lift motor.

Hereinafter, effects of the power control device and method thereof according to the examples of the present disclosure will be described.

According to at least one of the examples of the present disclosure, two types of batteries having different power densities and energy densities may be selectively used according to the flight environment of an aircraft to supply power to a motor, thereby reducing the weight of the aircraft and efficiently supplying power.

Additionally or alternatively, according to at least one of the examples of the present disclosure, (e.g., immediately) after take-off and (e.g., immediately) before entering cruise mode, some of the batteries may be charged using the charging current generated by regenerative braking of at least one lift motor, and efficient power control may be performed by using the charged power if landing.

Additionally or alternatively, according to at least one of the examples of the present disclosure, if an abnormality in a battery cell is identified in real time, and a battery including an abnormal cell such as undervoltage, overvoltage, or overtemperature is detected based on the identification result, it is possible to prevent accidents in advance by operating the pyro-switch to cut off the power supply from the battery.

Additionally or alternatively, according to at least one of the examples of the present disclosure, by constructing a pre-charging circuit in the power control circuit, a surging phenomenon may be prevented in the process of electrically connecting a battery and a motor and/or an inverter, and by constructing a DC/DC converter, safety problems due to voltage differences if connecting batteries of different types in parallel may be prevented in advance.

Various effects that are directly or indirectly understood through the present disclosure may be provided.

Although examples of the present disclosure have been described for illustrative purposes, those skilled in the art will appreciate that various modifications, additions and substitutions are possible, without departing from the scope and spirit of the disclosure.

Therefore, the examples disclosed in the present disclosure are provided for the sake of descriptions, not limiting the technical concepts of the present disclosure, and it should be understood that such examples are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A device for controlling power of an aircraft, the device comprising:

at least one first battery;

a second battery having a lower power density and higher energy density than the at least one first battery;

at least one lift motor connected, via a first electrical path, to the at least one first battery;

a cruise motor connected, via a second electrical path, to the second battery;

a capacitor connected to the cruise motor; and a power control circuit configured to control the at least one first battery, the second battery, the at least one lift motor, and the cruise motor, wherein the power control circuit includes:

the first electrical path, wherein the first electrical path comprises at least one of:

at least one first main relay, a first pre-charge relay, a first pre-charge resistor, or a first balance relay;

the second electrical path, wherein the second electrical path comprises at least one of:

at least one second main relay, a second pre-charge relay, or a second pre-charge resistor; and a third electrical path between the second battery and the at least one lift motor, the third electrical path comprising at least one of:

a DC/DC converter, or a third main relay, wherein, based on a time when the aircraft takes off or lands, the at least one first battery is configured to supply output power to the at least one lift motor via the at least one first main relay, or the second battery is configured to supply output power to the at least one lift motor via at least one of the third main relay or the DC/DC converter, wherein, based on the aircraft entering a cruise state after completing takeoff, the cruise motor is configured to be driven using an output power of the capacitor charged by the second battery, wherein, based on a time before the aircraft takes off, the at least one first battery and the second battery are connected in parallel to supply output power to the at least one lift motor, wherein, based on a value of the output power of the at least one first battery not satisfying a first threshold value, or a value of output power of the device for landing the aircraft not satisfying a second threshold value, the output power of the at least one first battery and the output power of the second battery are supplied to the at least one lift motor, wherein the DC/DC converter is configured to convert the output power of the second battery to be equal to the output power of the at least one first battery, and wherein the at least one first battery comprises a plurality of first batteries, and the first balance relay is configured to equalize output voltages among the plurality of first batteries prior to connecting the plurality of first batteries and the second battery in parallel to supply output power to the at least one lift motor.

2. The device of claim 1, wherein, based on a time before the aircraft takes off, the at least one first battery is configured to output a minimum value via at least one of the first pre-charge relay, the first pre-charge resistor, the first balance relay, or the at least one first main relay.

3. The device of claim 1, further comprising:

an inverter and a capacitor connected to the at least one lift motor.

4. The device of claim 3, wherein, based on a time before the aircraft takes off, the at least one first battery is configured to charge the capacitor via at least one of the at least one first main relay, the first pre-charge relay, or the first pre-charge resistor.

5. The device of claim 4, wherein the second battery and the at least one lift motor are connected to each other via at least one of the DC/DC converter or the third main relay.

6. The device of claim 1, further comprising:

a cruise inverter connected to the cruise motor.

7. The device of claim 6, wherein the capacitor is configured to be charged, based on the aircraft entering the cruise state after completing takeoff, with an output power of the second battery via the at least one second main relay.

8. The device of claim 1, wherein, based on a time before the aircraft takes off, the third electrical path is configured to have a connection state, and based on the cruise motor being driven, the third electrical path is configured to maintain the same connection state.

9. The device of claim 1, wherein, based on a time after the aircraft takes off, the at least one lift motor is configured to supply a charging current, generated by regenerative braking of the at least one lift motor, to the at least one first battery via the at least one first main relay.

10. The device of claim 9, wherein the third electrical path comprises a diode configured to block supply of the charging current to the second battery.

11. The device of claim 9, wherein, based on a time when the aircraft is landing, the at least one lift motor is configured to be driven via at least a portion of the charging current.

12. The device of claim 1, wherein the power control circuit further includes a pyro switch associated with at least one of the at least one first battery or the second battery, and based on occurrence of an error in the at least one of the first battery or the second battery, the power control circuit is further configured to operate the pyro switch to block power supply to the at least one of the first battery or the second battery.

13. A method for controlling power of an aircraft, the method comprising:

before the aircraft takes off, setting, by a power control device, an output power of at least one first battery to a minimum value by using at least one of a first pre-charge relay, a first pre-charge resistor, a first balance relay, or at least one first main relay;

before the aircraft takes off, charging, by the power control device, a capacitor with the output power of the at least one first battery by using at least one of the at least one first main relay, the first pre-charge relay, or the first pre-charge resistor;

connecting, by the power control device, a second battery and at least one lift motor by using at least one of a DC/DC converter or a third main relay;

connecting, by the power control device, the first battery and the second battery in parallel to supply output power to the at least one lift motor;

based on a value of the output power of the at least one first battery not satisfying a first threshold value, or a value of power for landing the aircraft not satisfying a second threshold value, supplying, by the power control device, the output power of the at least one first battery and the output power of the second battery to the at least one lift motor;

converting, by the DC/DC converter, the output power of the second battery to be equal to the output power of the at least one first battery; and equalizing, by the power control device, output voltages among a plurality of first batteries by using the first balance relay before connecting, by the power control device, the plurality of first batteries and the second battery in parallel to supply output power to the at least one lift motor, wherein the at least one first battery comprises the plurality of first batteries, wherein the second battery has a lower power density and higher energy density than the at least one first battery, wherein the at least one lift motor is connected to the at least one first battery, wherein for taking off or landing the aircraft:

supplying, by the power control device, the output power of the at least one first battery to the at least one lift motor by using the at least one first main relay; or supplying the output power of the second battery to the at least one lift motor by using at least one of the third main relay or the DC/DC converter, and wherein for entering a cruise state after completing take-off:

driving a cruise motor using an output power of the capacitor charged by the second battery.

14. The method of claim 13, further comprising:

charging, by the power control device and based on the aircraft entering the cruise state after completing take-off, the capacitor with the output power of the second battery via at least one second main relay.

15. The method of claim 13, wherein the power control device includes a power control circuit connected with the at least one first battery, the second battery, the at least one lift motor, and the cruise motor, further comprising:

controlling, by the power control circuit, at least one of the at least one first main relay, the first pre-charge relay, the first pre-charge resistor, or the first balance relay, wherein the at least one of the at least one first main relay, the first pre-charge relay, the first pre-charge resistor, or the first balance relay is arranged on a first electrical path between the at least one first battery and the at least one lift motor;

controlling, by the power control circuit, at least one of at least one second main relay, a second pre-charge relay, or a second pre-charge resistor, wherein the at least one of the at least one second main relay, the second pre-charge relay, or the second pre-charge resistor is arranged on a second electrical path between the second battery and the cruise motor; and controlling, by the power control circuit, at least one of the DC/DC converter or the third main relay, wherein the at least one of the DC/DC converter or the third main relay is arranged on a third electrical path between the second battery and the at least one lift motor.

16. The device of claim 1, wherein the first electrical path and the second electrical path do not share a common node, and wherein the first electrical path and the second electrical path do not share a common relay.

* * * * *